United States Patent
Bradshaw

(10) Patent No.: US 11,244,704 B2
(45) Date of Patent: *Feb. 8, 2022

(54) MAGNETIC RECORDING TAPE HAVING RESILIENT SUBSTRATE

(71) Applicant: International Business Machines Corporation, Armonk, NY (US)

(72) Inventor: Richard Bradshaw, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 95 days.

This patent is subject to a terminal disclaimer.

(21) Appl. No.: 16/573,902

(22) Filed: Sep. 17, 2019

(65) Prior Publication Data

US 2021/0082462 A1    Mar. 18, 2021

(51) Int. Cl.
| | | |
|---|---|---|
| G11B 5/73 | (2006.01) | |
| G11B 5/78 | (2006.01) | |
| G11B 5/008 | (2006.01) | |
| G11B 25/06 | (2006.01) | |
| G11B 5/66 | (2006.01) | |
| G11B 23/107 | (2006.01) | |

(52) U.S. Cl.
CPC ...... *G11B 5/73929* (2019.05); *G11B 5/00813* (2013.01); *G11B 5/66* (2013.01); *G11B 5/78* (2013.01); *G11B 25/063* (2013.01); *G11B 23/107* (2013.01)

(58) Field of Classification Search
None
See application file for complete search history.

(56) References Cited

U.S. PATENT DOCUMENTS

| | | | |
|---|---|---|---|
| 4,045,353 A | 8/1977 | Kosaka et al. | |
| 4,302,522 A | 11/1981 | Garnett et al. | |
| 4,435,350 A | 3/1984 | Fukushima et al. | |
| 4,816,341 A | 3/1989 | Nakayama et al. | |
| 4,966,797 A * | 10/1990 | Ishihara et al. | G11B 5/7027 428/339 |
| 5,059,468 A * | 10/1991 | Hashimoto et al. | G11B 5/725 428/332 |
| 5,246,782 A | 9/1993 | Kennedy et al. | |
| 5,558,945 A | 9/1996 | Miyazaki et al. | |

(Continued)

FOREIGN PATENT DOCUMENTS

| | | |
|---|---|---|
| CN | 1630680 A | 6/2005 |
| DE | 4126498 A1 | 2/1993 |
| WO | 2019093447 A1 | 5/2019 |

OTHER PUBLICATIONS

Bradshaw, R., U.S. Appl. No. 16/573,912, filed Sep. 17, 2019.

(Continued)

*Primary Examiner* — Craig A. Renner
(74) *Attorney, Agent, or Firm* — Zilka-Kotab, P.C.

(57) ABSTRACT

A magnetic recording tape, in accordance with one approach, includes a substrate comprising a poly ether ether ketone (PEEK). An underlayer is positioned above the substrate. A recording layer is positioned above the underlayer. A tape cartridge, in accordance with one approach, includes a housing and a magnetic recording tape at least partially stored in the housing. The magnetic recording tape includes a substrate comprising a poly ether ether ketone (PEEK), an underlayer above the substrate, and a recording layer above the underlayer.

19 Claims, 12 Drawing Sheets

(56) References Cited

U.S. PATENT DOCUMENTS

| | | | |
|---|---|---|---|
| 5,674,637 A | 10/1997 | Miyazaki et al. | |
| 5,677,051 A | 10/1997 | Ueda et al. | |
| 5,689,384 A | 11/1997 | Albrecht et al. | |
| 5,705,268 A | 1/1998 | Ishikawa et al. | |
| 5,871,823 A | 2/1999 | Anders et al. | |
| 5,989,680 A * | 11/1999 | Wakana et al. | G11B 5/70 428/336 |
| 5,997,741 A | 12/1999 | Shimoda et al. | |
| 6,021,013 A | 2/2000 | Albrecht et al. | |
| 6,033,760 A | 3/2000 | Wakana et al. | |
| 6,040,052 A | 3/2000 | Kanazawa et al. | |
| 6,566,484 B2 | 5/2003 | Gharda et al. | |
| 6,797,381 B1 | 9/2004 | Tsukuda et al. | |
| 6,881,816 B2 | 4/2005 | Gharda et al. | |
| 7,255,908 B2 | 8/2007 | Ishikawa et al. | |
| 8,609,264 B2 | 12/2013 | Mitsuoka et al. | |
| 9,105,294 B2 | 8/2015 | Jensen et al. | |
| 9,812,677 B2 | 11/2017 | Mank et al. | |
| 2002/0041982 A1 | 4/2002 | Katashima et al. | |
| 2002/0105752 A1 | 8/2002 | Soda et al. | |
| 2003/0044564 A1 | 3/2003 | Dris et al. | |
| 2004/0165306 A1 | 8/2004 | Soda et al. | |
| 2005/0049320 A1 | 3/2005 | Yoshida et al. | |
| 2010/0024951 A1 | 2/2010 | Takahashi | |
| 2010/0092656 A1 | 4/2010 | Kozicki | |
| 2010/0221582 A1 | 9/2010 | Kawai et al. | |
| 2014/0087089 A1 * | 3/2014 | Biskeborn et al. | G11B 5/3106 427/551 |
| 2016/0208045 A1 | 7/2016 | Slater et al. | |
| 2019/0180781 A1 | 6/2019 | Handa et al. | |
| 2019/0334046 A1 | 10/2019 | Ikoma et al. | |
| 2020/0342901 A1 | 10/2020 | Enomoto et al. | |
| 2020/0342904 A1 | 10/2020 | Yamaga et al. | |
| 2021/0082466 A1 | 3/2021 | Bradshaw | |
| 2021/0151078 A1 | 5/2021 | Bradshaw | |

OTHER PUBLICATIONS

Non-Final Office Action from U.S. Appl. No. 16/573,912, dated Dec. 11, 2020.
Bradshaw, R., U.S. Appl. No. 17/129,577, filed Dec. 21, 2020.
International Search Report and Written Opinion from PCT Application No. PCT/IB2020/058616, dated Dec. 30, 2020.
Non-Final Office Action from U.S. Appl. No. 16/573,912, dated Jan. 27, 2021.
Wikipedia, "Polyether ether ketone," Wikipedia, updated on Sep. 5, 2019, 3 pages, retrieved from https://en.wikipedia.org/wiki/Polyether_ether_ketone.
Solvay, "KetaSpire PEEK," Solvay, 2019, 7 pages, retrieved from https://www.solvay.com/en/brands/ketaspire-peek.
Victrex, "Victrex Peek Polymers," Victrex, 2019, 2 pages, retrieved from https://www.victrex.com/en/victrex-peek.
Non-Final Office Action from U.S. Appl. No. 17/129,577, dated Jun. 24, 2021.
Non-Final Office Action from U.S. Appl. No. 16/573,912, dated Jun. 14, 2021.
Bhardwaj et al., "Harmonized Protocol for Radiation-Induced Grafting," IAEA Workshop, Mar. 2014, 34 pages.
Guven, O., "Radiation-Induced Graft Polymerization: Basics," Department of Chemistry, Hacettepe University, Sep. 12, 2016, 42 pages.
Final Office Action from U.S. Appl. No. 16/573,912, dated Nov. 1, 2021.
Non-Final Office Action from U.S. Appl. No. 17/129,577, dated Nov. 4, 2021.
Gupta et al., "Preparation of proton exchange membranes by radiation-induced grafting of alpha methyl styrene-butyl acrylate mixture onto polyetheretherketone (PEEK) films," Polymer Bulletin, Oct. 2013, pp. 2691-2708.

* cited by examiner

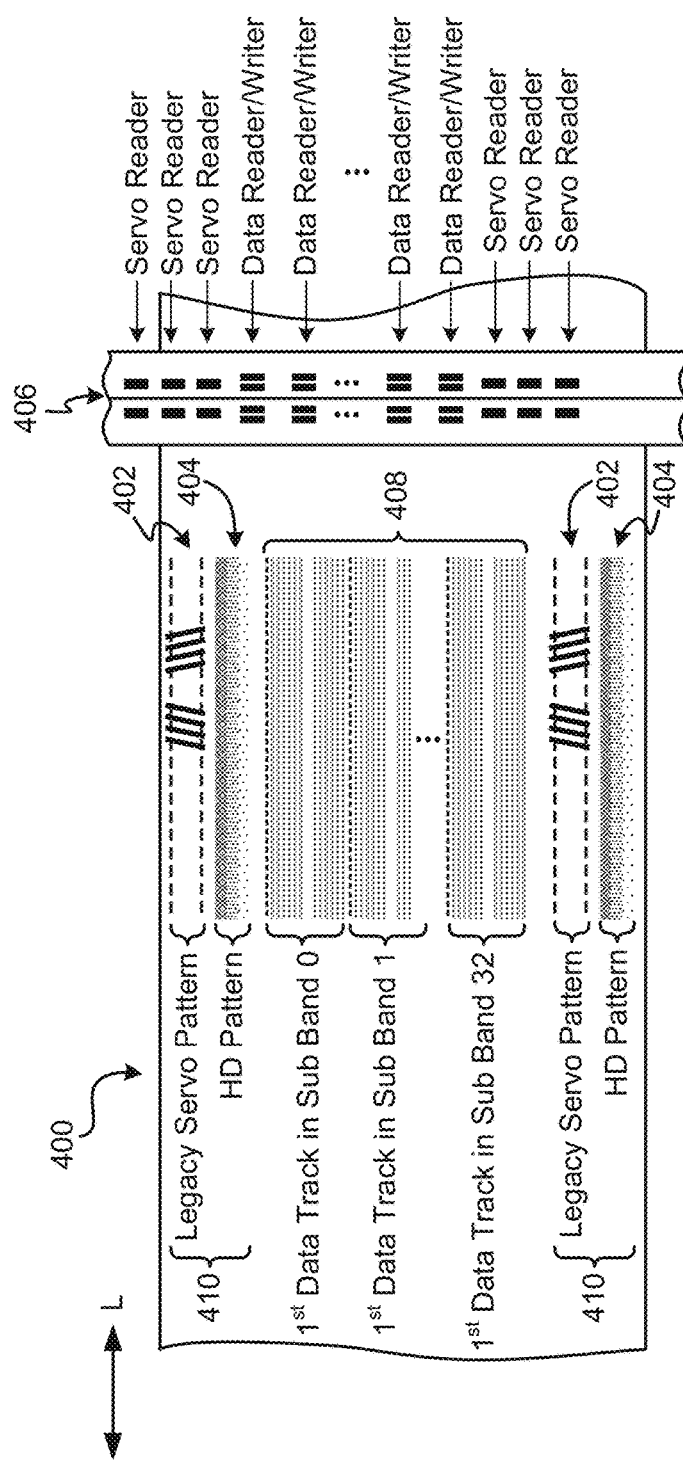
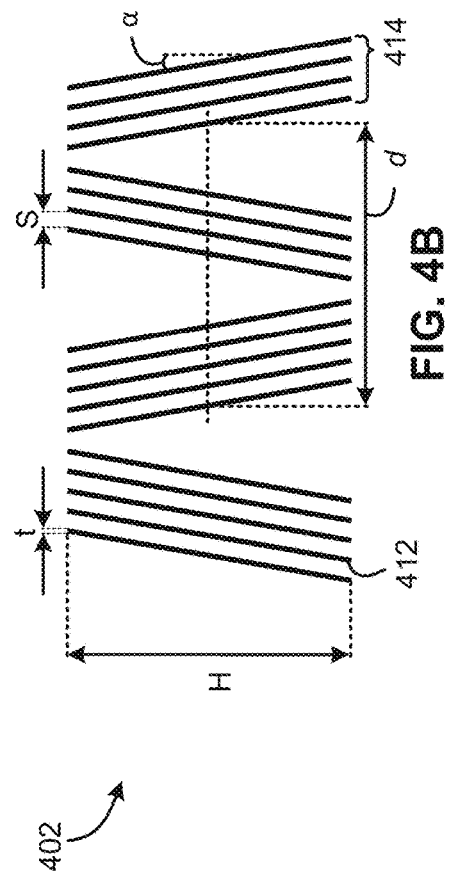
FIG. 4A
FIG. 4B

MAGNETIC RECORDING TAPE HAVING RESILIENT SUBSTRATE

BACKGROUND

The present invention relates to magnetic recording media, and more particularly, this invention relates to various configurations of a substrate for magnetic recording tape media.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape and decreasing the thickness of the magnetic tape medium. However, the development of small footprint, higher performance tape drive systems has created various challenges ranging from the design of tape head assemblies for use in such systems to dealing with tape dimensional instability.

One increasingly format-limiting problem that arises with an increase in track and data density is tape dimensional stability, particularly lateral dimensional stability. Tape lateral contraction and expansion is a well-known phenomenon that occurs due to a plethora of effects, including absorption of water, thermal expansion and contraction, etc. Changes in tape width can result in many adverse occurrences, such as overwriting of previously-written data tracks when performing shingled writing, inability to read data tracks that are no longer aligned with the readers (particularly prevalent toward outer ends of the reader array), etc.

More permanent changes in media lateral dimensions may also occur, such as long-term media creep (also known in the art as "aging"), which tends to occur over time when a tape is wound around a hub of a tape cartridge. Long-term media creep is particularly problematic when dealing with tape dimensional stability issues, as the two ends of the tape exhibit creep in different ways. The inner wraps of tape positioned closest to the cartridge hub tend to expand laterally over time due to the compressive stresses exerted thereon by the wraps of tape wound around them. Wraps positioned toward the outer diameter of the spool of tape are under less compressive stress, but are under higher tensile stresses, which tends to cause lateral contraction of the tape, i.e., the tape becomes narrower over time. Accordingly, the ends of the tape tend to exhibit oppositely-oriented lateral dimensional changes.

When the dimensions of the tape change, various issues arise. During writing, the likelihood of overwriting shingled tracks increases. Overwritten data is often unrecoverable. Likewise, where the width of the tape has changed since the desired data was written, the readers may no longer be positioned over the tracks to be read, increasing reading errors.

The substrate is typically the thickest layer in a magnetic recording tape, and therefore tends to have the greatest effect on tape lateral stability. Said another way, the substrate tends to dominate the entire laminate tape structure in terms of dimensional changes.

Current magnetic recording tape substrate materials, such as polyethylene naphthalate (PEN) and aramids, suffer from a variety of problems such as poor tape dimensional stability (TDS), sensitivity to humidity, poor creep recovery, and/or other shortcomings, rendering them unsatisfactory for magnetic recording tapes having higher data densities than those currently on the market.

Current substrates have reached the limits of possible modification to improve their sensitivity to water and temperature, as well as overcome the aforementioned problems.

SUMMARY

A magnetic recording tape, in accordance with one approach, includes a substrate comprising a poly ether ether ketone (PEEK). An underlayer is positioned above the substrate. A recording layer is positioned above the underlayer.

Magnetic recording tapes having a PEEK substrate possess excellent elasticity for typical tape operations, as well as exhibiting stable creep and recovery for the typical storage and operating temperatures, about 0° C. to about 60° C. Shrinkage of a PEEK substrate is expected to be less than 1% across a 100° C. temperature range encompassing the aforementioned operating range. Such benefits are found in preferred approaches in which a chain length of the PEEK is greater than about 20, and more preferably about 50 to about 100.

Magnetic recording tapes having a PEEK substrate also have a low sensitivity to temperature and humidity over this entire operating range. PEEK is generally hydrophobic, rendering it water-stable. Water absorption is expected to be far less than 1% at 50% relative humidity, which is far less than aramid which tends to have about 10% absorption at 50% relative humidity.

Magnetic recording tapes having a PEEK substrate have stable mechanical properties. For example, the tensile storage (E') modulus and tensile loss (E"") modulus are both lower than conventional media substrates, as measured with dynamic mechanical analysis methods such as Dynamic Mechanical Thermal Analysis (DMTA) for typical operating and storage environments for tape media. In one aspect, a tensile storage (E') modulus of the substrate as measured by dynamic thermal mechanical analysis is in a range of about 4 GPa to about 20 GPa.

A further benefit of PEEK is that the PEEK raw material can be melted without degradation, which enables PEEK to be processed into a thin film at temperatures about its melting point, without losing its desirable properties.

In one aspect, the underlayer is grafted to the substrate. The grafting results in a bond between layers that is stronger than conventional coupling techniques, which is advantageous in terms of robustness and resistance to stresses.

Each of the foregoing is important for maintaining dimensional stability, both in use, and during long term storage.

A tape cartridge in accordance with one aspect includes a housing and a magnetic recording tape at least partially stored in the housing. The magnetic recording tape has a construction as listed above.

Other aspects and approaches of the present invention will become apparent from the following detailed description,

BRIEF DESCRIPTION OF THE DRAWINGS

FIG. 4A shows a hybrid servo pattern written in a dedicated area of a tape medium, in accordance with one approach.

FIG. 4B shows a partial detailed view of a TBS pattern, in accordance with one approach.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses various configurations of a substrate particularly useful in magnetic recording tape media, as well as methods for forming the substrate and magnetic recording tape media.

In one general approach, a magnetic recording tape includes a substrate comprising a poly ether ether ketone (PEEK). An underlayer is positioned above the substrate. A recording layer is positioned above the underlayer.

In another general approach, a tape cartridge includes a housing and a magnetic recording tape at least partially stored in the housing. The magnetic recording tape has a construction as listed above.

Illustrative Operating Environment

Figure 1A:
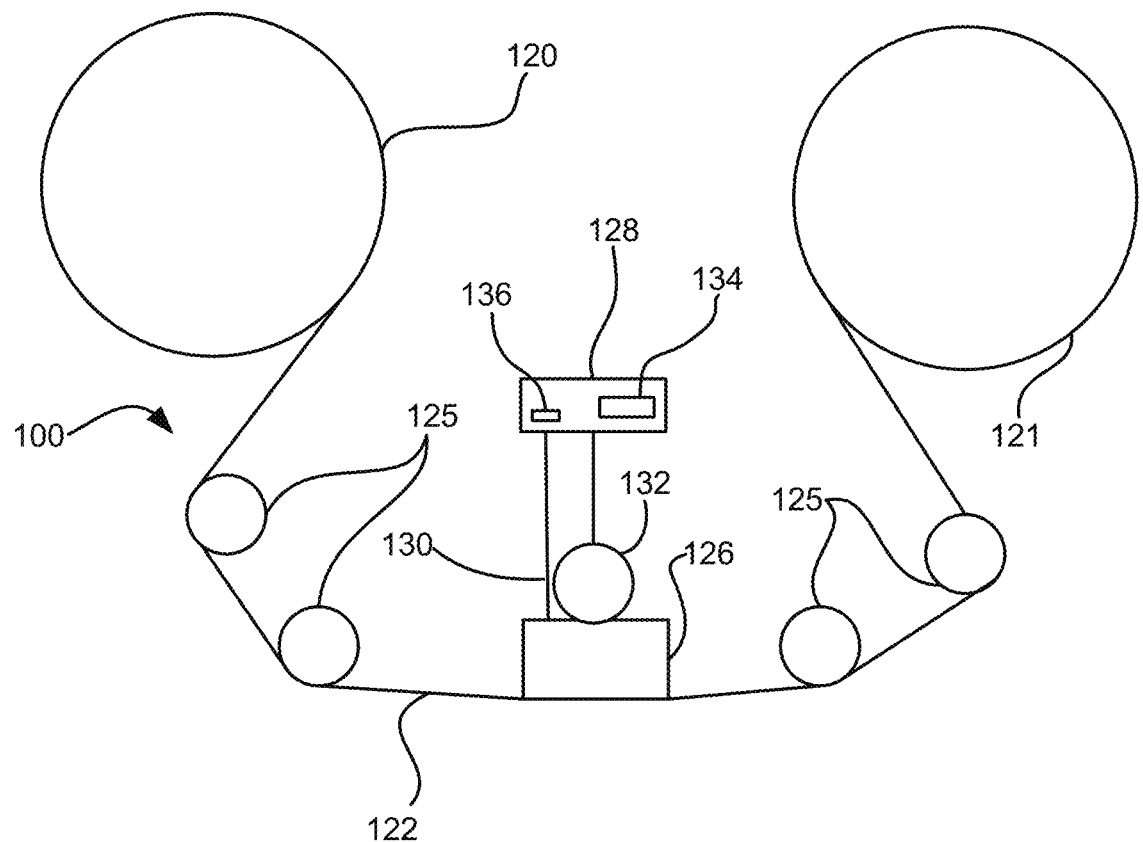
FIG. 1A is a schematic diagram of a simplified tape drive system.

FIG. 1A illustrates a simplified tape drive 100 of a tape-based data storage system, which may be employed in the context of the present invention. While one specific implementation of a tape drive is shown in FIG. 1A, it should be noted that the approaches described herein may be implemented in the context of any type of tape drive system.

As shown, a tape supply cartridge 120 and a take-up reel 121 are provided to support a tape 122. One or more of the reels may form part of a removable cartridge and are not necessarily part of the tape drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various approaches. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the tape head 126 to be recorded on the tape 122 and to receive data read by the tape head 126 from the tape 122. An actuator 132 controls position of the tape head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
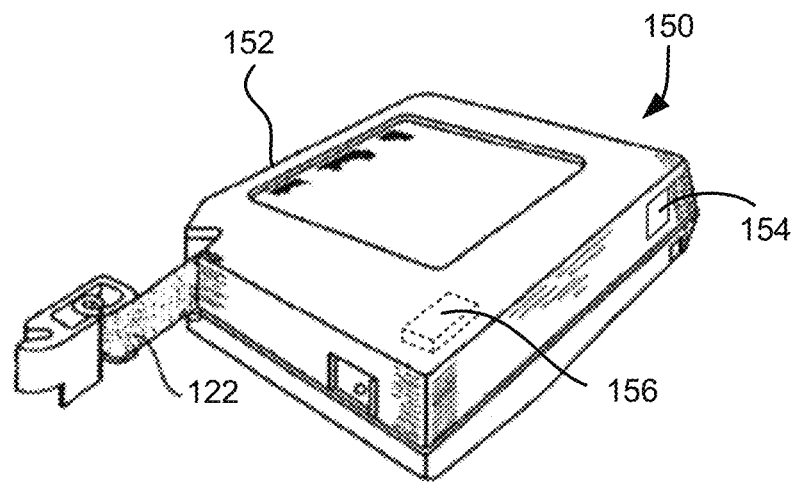
FIG. 1B is a schematic diagram of a tape cartridge according to one aspect of the present invention.

FIG. 1B illustrates an exemplary tape cartridge 150, which in various approaches may include any configuration of the magnetic recording media described herein in tape form. Such tape cartridge 150 may be used with a system such as that shown in FIG. 1A. As shown, the tape cartridge 150 includes a housing 152, a tape 122 in the housing 152, and an optional nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred approach, the nonvolatile memory 156 may be solid state memory (e.g., Flash memory), read-only memory (ROM) device, etc., embedded into or coupled to the inside or outside of the tape cartridge 150. The nonvolatile memory is accessible by the tape drive and the tape operating software (the driver software), and/or another device.

Figure 2A:
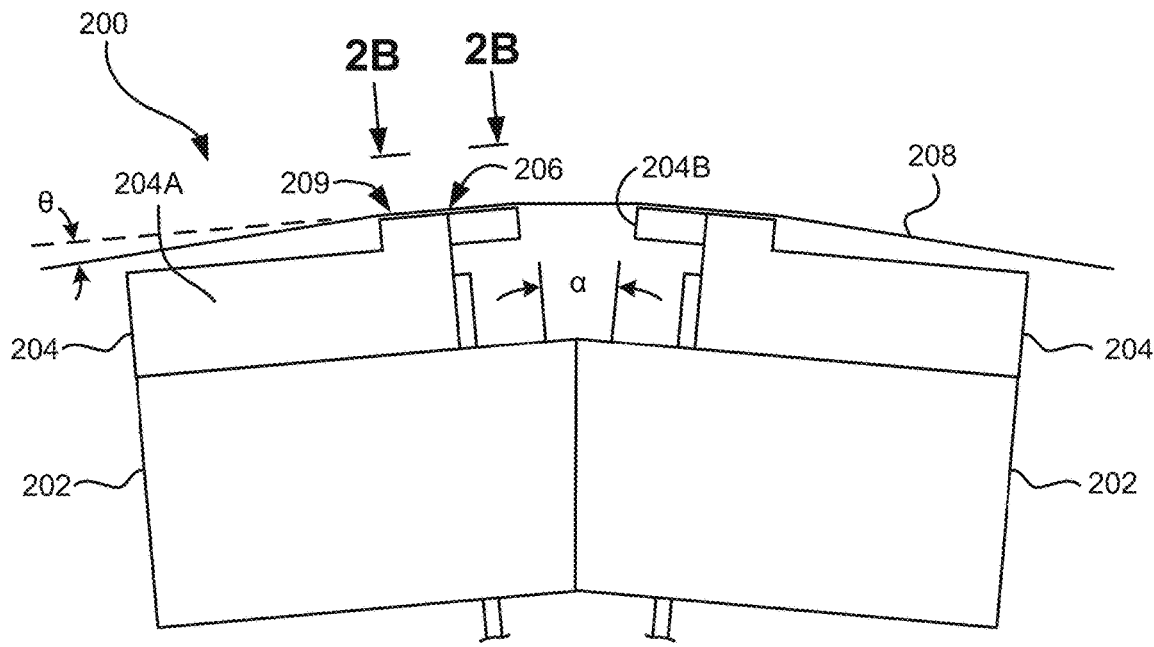
FIG. 2A illustrates a side view of a flat-lapped, bi-directional, two-module magnetic tape head according to one aspect of the present invention.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2B:
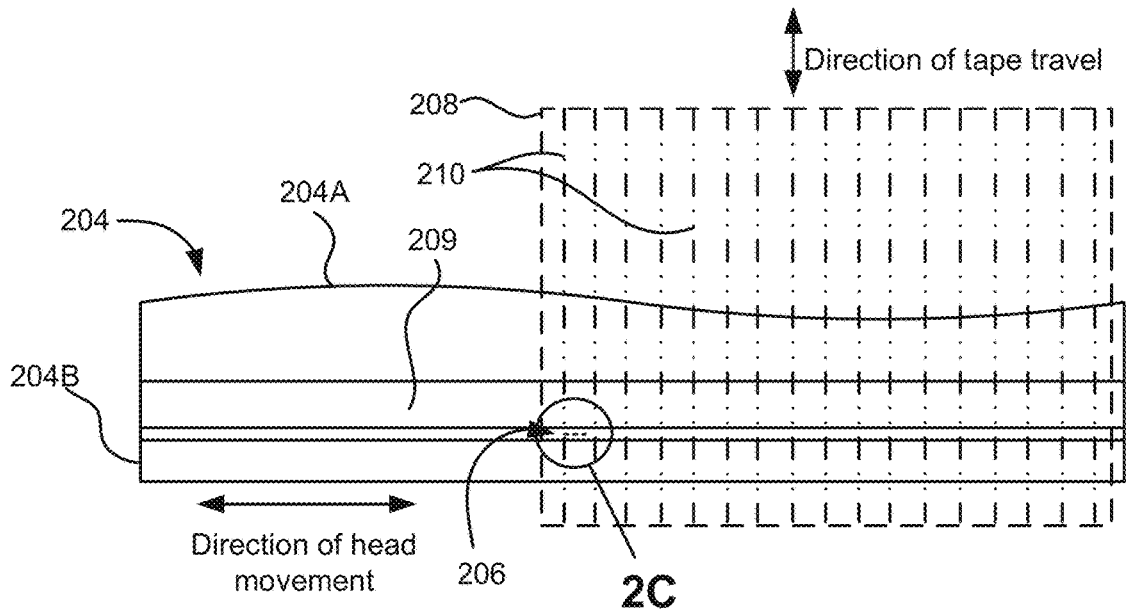
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2C:
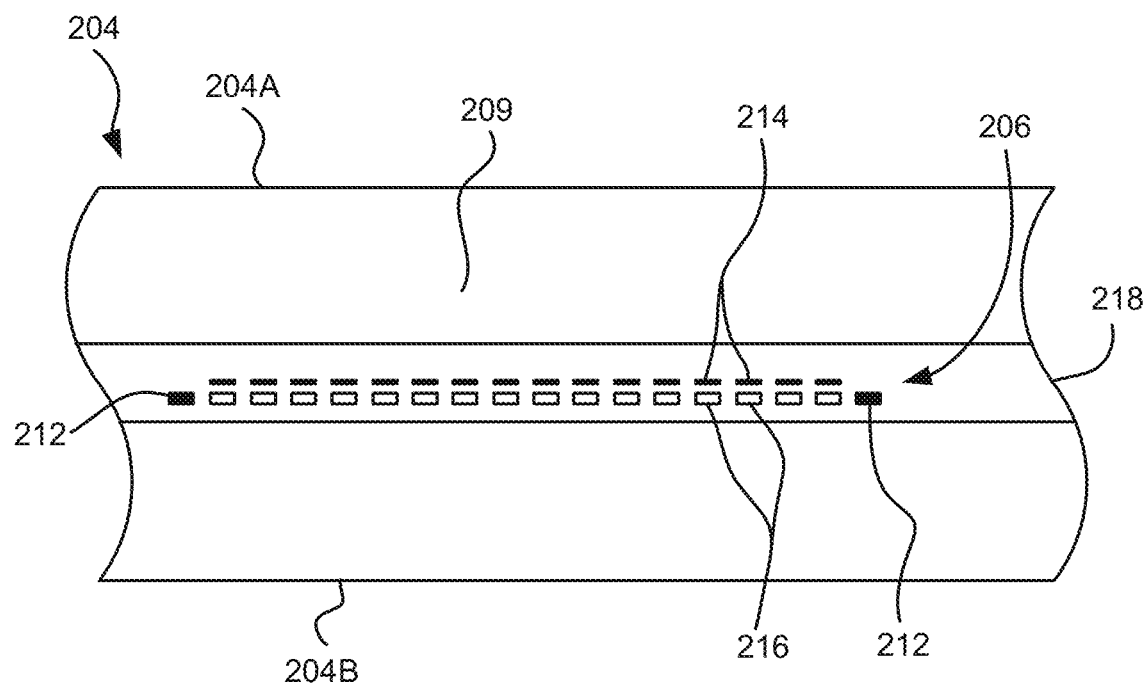
FIG. 2C is a detailed view taken from Circle 2C of FIG. 2B.

FIG. 2C depicts a plurality of readers and/or writers 206 formed in a gap 218 on the module 204 in Circle 2C of FIG. 2B. As shown, the array of readers and writers 206 includes, for example, 16 writers 214, 16 readers 216 and two servo readers 212, though the number of elements may vary. Illustrative approaches include 8, 16, 32, 40, and 64 active readers and/or writers 206 per array, and alternatively interleaved designs having odd numbers of reader or writers such as 17, 25, 33, etc. An illustrative approach includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2C, the readers 216 and writers 214 may also be arranged in an interleaved configuration. Alternatively, each array of readers and/or writers 206 may be readers or writers only, and the arrays may contain one or more servo readers 212. As noted by considering FIGS. 2A and 2B-2C together, each module 204 may include a complementary set of readers and/or writers 206 for such things as bi-directional reading and writing, read-while-write capability, backward compatibility, etc.

Timing-Based Servo

The write and read elements allow magnetic regions in the recording layer of the magnetic recording tape to be magnetized to form bits of magnetic segments which appear as rectangular sections that display either increased or decreased magnetic signal as detected by a magnetically sensitive detector such as a magnetic force microscopic (MFM) detector.

The placement of the data in isolated tracks requires real time position information as to the location of existing written information on a tape to prevent accidental erasure or the previously-written information. In the case of the initial writing of data to a formatted tape which contains no written data, the position of the initial data bands needs to be carefully controlled and recorded to allow subsequent data bands to be correctly positioned so as to not overwrite or encroach on the previously-written data.

Modern high density tape formats use a very accurate servo pattern referred to as timing-based servo, which is well known to those skilled in the art. A description of an illustrative timing-based servo scheme is provided below.

The track following servo contains transitions recorded at more than one azimuthal orientation across the width of the servo track. The timing of the signal derived from reading at any point across the width of the written pattern created in a tape media in a controlled, precise factory format operation is used to calculate the position of the magnetic recording head in real time. The pattern is read by a servo reader whose width is small compared to the servo track width. The combination of a wide servo pattern and a narrow servo reader offers excellent position sensing linearity and dynamic range.

Position sensing with the timing-based servo system is achieved by deriving a ratio of two servo pattern intervals and therefore is insensitive to tape speed during read back of the recorded signal. Detection of the center of the servo pattern during tape motion provides a precise reference point to each band of data. The difference between the centers of the two servo readers used in each read or write motion of a tape across the recording head is a measure of the spacing between the two servo bands on the tape which were previously recorded during factory formatting. The servo readers are fixed in the head structure but do move at very small nanometer scales due to stress and environmental factors. Thus, the real position of the spacing between the servo bands written on the tape do move relative to each other and results in a change in the real spacing between the data bands, previously existing or being written over the existing data tracks.

Figure 3:
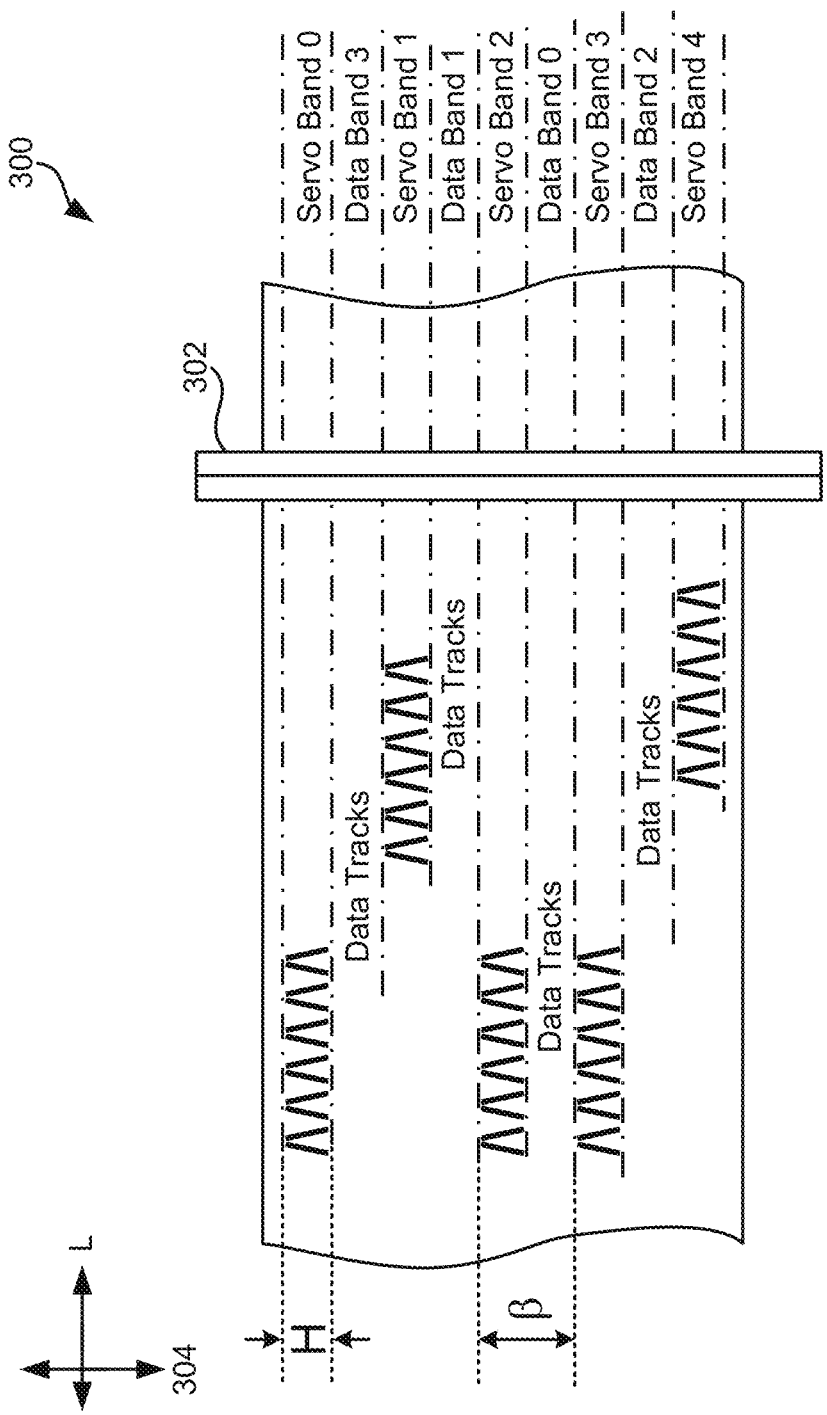
FIG. 3 illustrates a tape layout, in accordance with one approach.

Referring momentarily to FIG. 3, an illustrative tape layout is depicted in accordance with one approach. As shown, tape 300 has a tape layout which implements five servo bands Servo Band 0—Servo Band 4, and four data bands Data Band 0—Data Band 3, as specified in the LTO format and IBM® Enterprise format. The height H of each of the servo bands is measured in the cross-track direction 304 which is about orthogonal to the length L of the tape 300. According to an example, the height H of each of the servo bands may be about 186 microns according to the LTO format. Moreover, a pitch β between the servo bands as shown may be about 2859 microns, again according to the LTO format.

An exemplary tape head 302 is also shown as having two modules and as being positioned over a portion of the tape 300 according to one approach. Read and/or write transducers may be positioned on either module of the tape head 302 according to any of the approaches described herein, and may be used to read data from and/or write data to the data bands. Furthermore, tape head 302 may include servo readers which may be used to read the servo patterns in the servo bands according to any of the approaches described herein. It should also be noted that the dimensions of the various components included in FIG. 3 are presented by way of example only and are in no way intended to be limiting.

Some tape drives may be configured to operate at low tape velocities and/or with nanometer head position settings. These tape drives may use servo formats that target Barium Ferrite (BaFe) tape media, 4 or 8 data bands, 32 or 64 data channel operation, allow very low velocity operation, support large-bandwidth actuator operation, and improve parameter estimation to minimize standard deviation of the position error signal (PES), thus enabling track-density scaling for tape cartridge capacities up to 100 TB and beyond.

However, according to some approaches, magnetic tape may further be augmented with additional features that provide additional functionality. Accordingly, HD servo patterns may be implemented in place of the standard TBS servo patterns, e.g., as seen in FIG. 3. The HD servo patterns may be used to improve track-following performance.

In still further approaches, a standard TBS servo pattern (e.g., as shown in FIG. 3) may be implemented in combination with one or more HD servo patterns (e.g., see FIG. 4A below). One implementation includes a hybrid servo pattern scheme, in which a standard TBS pattern is retained and additional HD patterns are provided in a dedicated, preferably currently unused area of the tape media. This type of pattern may be implemented by increasing the number of data channels from 16 to 32, and reducing the width of the TBS pattern from 186 microns to 93 microns, in some approaches.

A hybrid servo pattern 410, which includes a standard TBS pattern 402 written in a servo band, as well as an HD pattern 404 that is written in a HD band (e.g., dedicated area) of the tape medium 408 is shown in FIG. 4A. Moreover, each HD pattern 404 includes a number of HD tracks, each of the HD tracks having a respective periodic waveform. In some approaches, significant features of the original TBS pattern 402 are retained, such as a servo frame structure consisting of four servo bursts containing a number of servo stripes, where the servo stripes of adjacent servo bursts are written with alternating azimuthal angle. Other parameters of legacy servo patterns, such as the servo pattern height and other geometric dimensions, as well as the number of servo stripes per burst, may be modified as desired.

The HD pattern 404 may include periodic waveforms of various frequencies alternately written in the length direction L along a longitudinal axis of the tape. The standard TBS pattern 402 may be used to provide initial identification of the servo band (e.g., by providing a servo band ID); initial positioning of the head 406 on an appropriate servo location; acquisition of initial servo channel parameters, such as tape velocity, lateral head position, head-to-tape skew, longitudinal position (LPOS), etc.; etc. Moreover, the HD pattern 404 may enable more accurate and more frequent estimates of servo channel parameters, thereby achieving improved head positioning at a much wider range of tape velocities and support for larger bandwidth head actuation. As such, track-density scaling may be enabled for very large cartridge capacities, as well as improved data rate scaling with host computer requirements through the support of a wider velocity range.

Referring again to FIG. 4A, which shows a tape layout 400 with a hybrid servo pattern 410 according to one approach, in the hybrid servo pattern 410, an HD pattern 404 is written in a space adjacent to a standard TBS pattern 402. According to the present approach, quadrature sequences are not included due to the use of the TBS pattern 402, which is converse to products implementing servo functionality in hard-disk drives.

Looking momentarily to FIG. 4B, a partial detailed view of a TBS pattern 402 (e.g., a TBS frame) is illustrated according to an exemplary approach. As shown, a plurality of servo stripes 412 together form a servo burst 414, while corresponding pairs of servo bursts 414 form servo subframes. Accordingly, the depicted TBS frame has four servo bursts 414 and two servo sub-frames. In the present approach, the servo bursts 414 included in the left servo sub-frame each have five servo stripes 412, while the servo bursts 414 included in the right servo sub-frame each have four servo stripes 412. The servo stripes 412 included in a given servo burst 414 are oriented such that they have a same azimuthal slope represented by angle α. Moreover, corresponding pairs of servo bursts 414 have opposing azimuthal slopes, thereby forming a chevron-type pattern. The height H and thickness t of the servo stripes 412 may vary depending on the servo writer used to write the TBS pattern 402. According to an exemplary approach, which is in no way intended to limit the invention, the height H may be about 186 μm, and the angle α may be about 6°, while the thickness t is about 2.1 μm. Moreover, the spacing S between each of the servo stripes 412 and/or the distance d between servo bursts 414 having the same azimuthal slope may vary depending on the desired approach. According to an exemplary approach, which is in no way intended to limit the invention, the spacing S may be about 5 μm, while the distance d is about 100 μm. As described above, patterned transitions such as that shown in FIG. 4B allow for an estimate of the head lateral position to be determined by evaluating the relative timing of pulses generated by a servo reader reading the servo stripes 412 of the servo burst 414 as they are passed over the servo reader.

Tape Dimensional Stability Problem

Figure 5A:
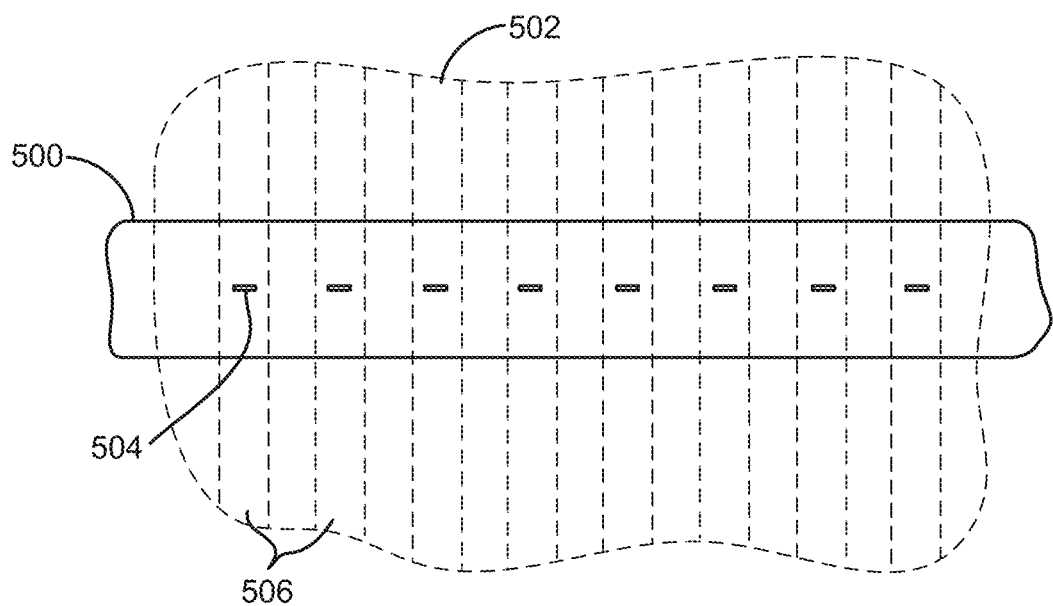
FIGS. 5A-5C are partial top-down representative views of the effects of tape expansion and contraction.
Figure 5B:
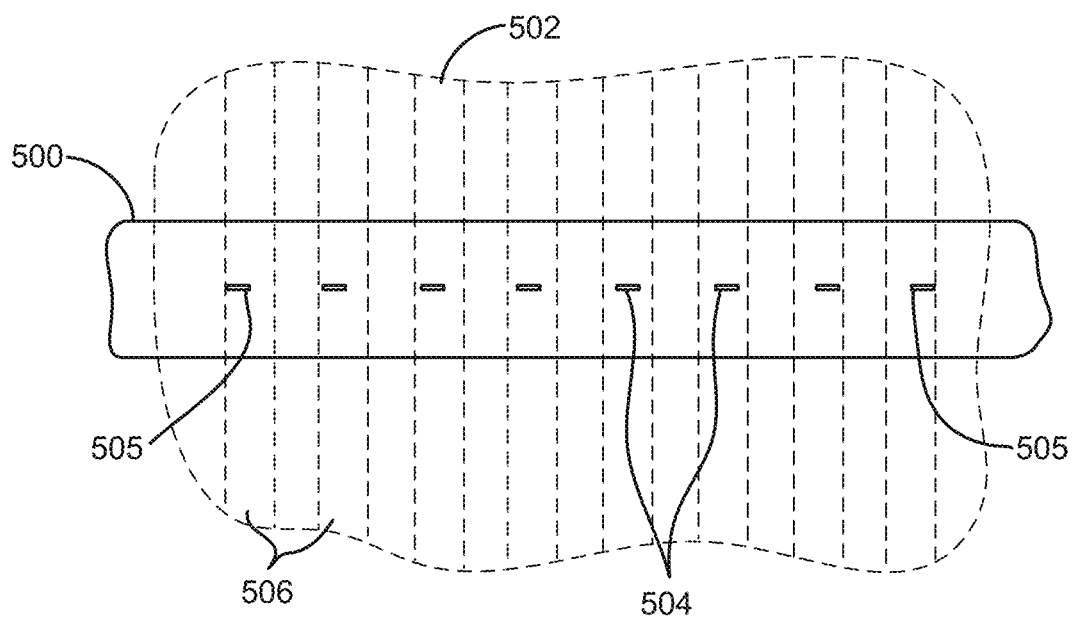
Figure 5C:
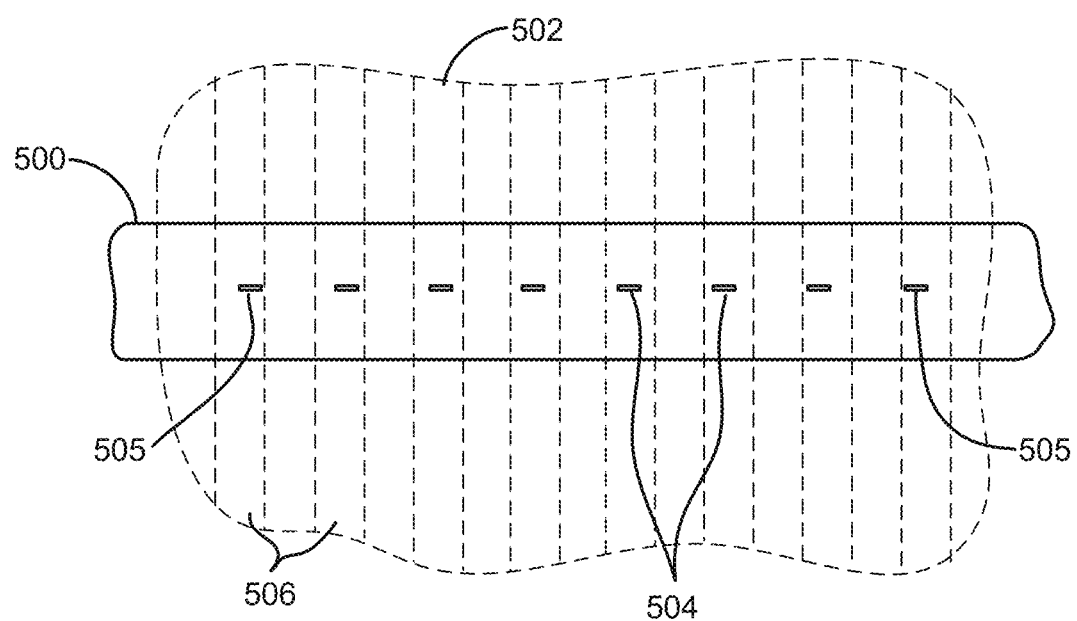

FIGS. 5A-5C depict the effect of tape lateral expansion and contraction on transducer arrays position relative thereto, and are in no way intended to limit the invention. FIG. 5A depicts a transducer array 500 relative to the tape 502, where the tape has a nominal width. As shown, the transducers 504 are favorably aligned with the data tracks 506 on the tape 502. However, FIG. 5B illustrates the effect of tape lateral contraction. As shown, contraction of the tape causes the data tracks to contract as well, and the outermost transducers 505 are positioned along the outer edges of the outer data tracks as a result. Moreover, FIG. 5C depicts the effect of tape lateral expansion. Here expansion of the tape causes the data tracks to move farther apart, and the outermost transducers 505 are positioned along the inner edges of the outer data tracks as a result. If the tape lateral contraction is greater than that shown in FIG. 5B, or the tape lateral expansion is greater than that shown in FIG. 5C, the outermost transducers 505 will cross onto adjacent tracks, thereby causing the adjacent tracks to be overwritten during a writing operation and/or resulting in readback of the wrong track during a readback operation. Moreover, running effects, such as tape skew and lateral shifting may exacerbate such problems, particularly for tape having shingled data tracks.

Accordingly, tape lateral expansion and contraction is an ongoing issue in tape development, and is currently a limiting factor in further reducing increasing data density on tape.

Magnetic Recording Media and Fabrication of Layers Thereof

Figure 6:
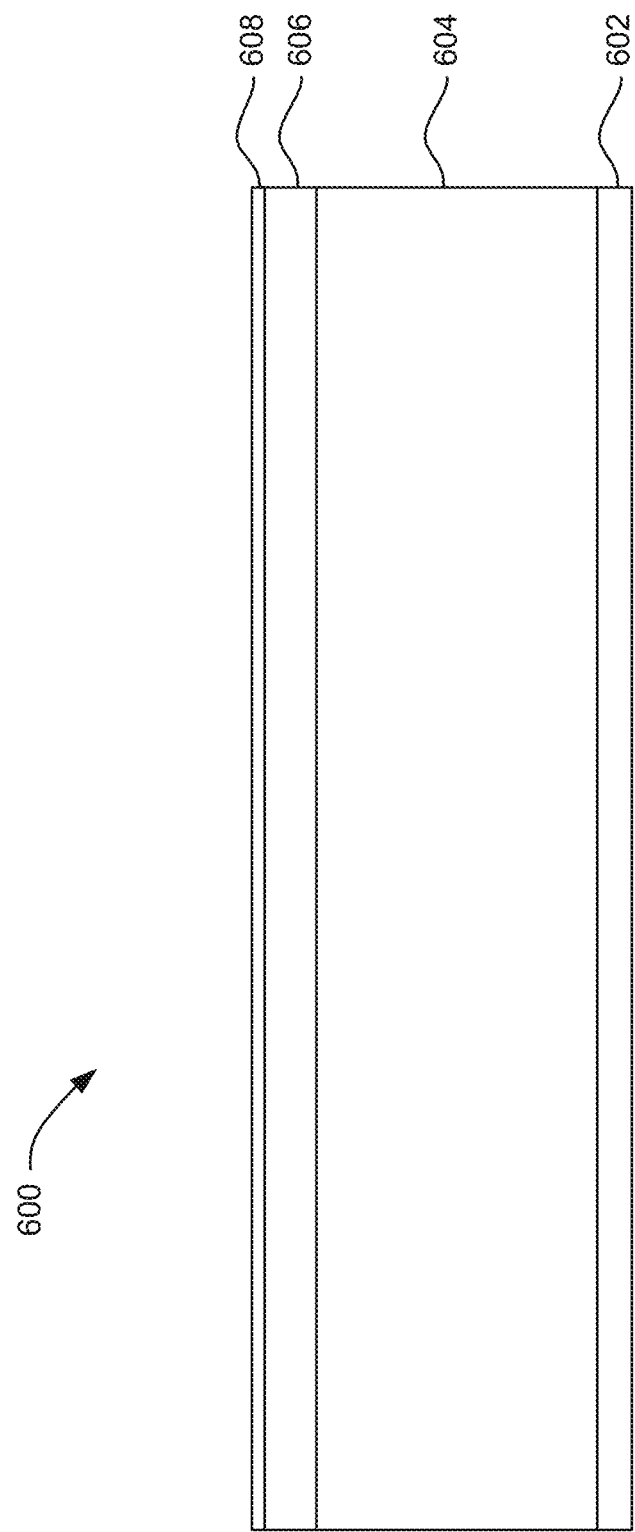
FIG. 6 is a partial cross-sectional view of the basic structure of a magnetic recording medium, in accordance with various approaches.

FIG. 6 depicts a partial cross-sectional view of the basic structure of a magnetic recording medium 600, not to scale, in accordance with various approaches described herein. As an option, the present magnetic recording medium 600 may be implemented in conjunction with features from any other approach listed herein, such as those described with reference to the other FIGS. Of course, however, such magnetic recording medium 600 and others presented herein may be used in various applications and/or in permutations which may or may not be specifically described in the illustrative approaches listed herein. Further, the magnetic recording medium 600 presented herein may be used in any desired environment. The magnetic recording medium 600 in various permutations disclosed herein was developed to improve the stability and performance of tape storage media over the required environments for use and storage.

Except as otherwise described herein, the various layers of the magnetic recording medium 600 may be of conventional construction, design and/or function. In various approaches, a new and novel layer may be used with conventional layers. In further approaches, multiple new and novel layers may be used together with other conventional layers.

Except as otherwise described herein, the various layers of the magnetic recording medium 600 may be formed using conventional methods, especially where the respective layer is of conventional construction.

The magnetic recording medium 600 is preferably a magnetic recording tape, but in other aspects is a different type of deformable media.

As shown in FIG. 6, four basic layers are typically present in the magnetic recording medium 600. An optional backcoat 602 is positioned along one side (lower side in the FIG.) of a substrate 604. An underlayer 606 is positioned along another side (upper side in the FIG.) of the substrate 604. A recording layer 608 is positioned above the underlayer 606. Additional layers of conventional construction may be present in the magnetic recording medium 600, in various approaches.

Backcoat

The backcoat 602 may or may not be present in the magnetic recording medium 600. The backcoat 602 may be of a known material, and selected as a material that is capable of being grafted to the substrate 604 via radiation-induced grafting. Preferably, the backcoat 602 is constructed of a material that provides one or more of the following benefits: facilitate separation from another section of the tape wound thereover on a spool, tribology improvement, dissipation of static electricity, etc. A preferred thickness of the backcoat 602 is less than about 0.3 microns, preferably less than about 0.2 microns.

Substrate

The substrate 604 is of new and novel construction, as disclosed herein. The substrate 604 is formed of poly ether ether ketone (PEEK). PEEK, as used herein, more broadly refers to a class of materials collectively known in the art as a PEEK material, such as various types of poly aryl ether ketones (PAEKs), poly ether ether ketone, and the like.

Magnetic recording tapes having a PEEK substrate 604 have stable mechanical properties. For example, the tensile storage (E') modulus and tensile loss (E''') modulus are both lower than conventional media substrates, as measured with dynamic mechanical analysis methods such as Dynamic Mechanical Thermal Analysis (DMTA) for typical operating and storage environments for tape media. In general, typical operating and storage environments for tape media are in in a range of about 0° C. to about 60° C., and about 5% to about 80% relative humidity.

Magnetic recording tapes having a PEEK substrate 604 also have a low sensitivity to temperature and humidity over this entire operating range. PEEK is generally hydrophobic, rendering it water-stable. Water absorption is expected to be far less than 1% at 50% relative humidity, which is far less than aramid which tends to have about 10% absorption at 50% relative humidity.

Magnetic recording tapes having a PEEK substrate 604 also possess excellent elasticity for typical tape operations, as well as exhibiting stable creep and recovery for the typical storage and operating temperatures, about 0° C. to about 60° C. Shrinkage of a PEEK substrate is expected to be less than 1% across a 100° C. temperature range encompassing the aforementioned operating range.

A further benefit of PEEK is that the PEEK raw material can be melted without degradation, which enables PEEK to be processed into a thin film at temperatures about its melting point, without losing its desirable properties.

Each of the foregoing is important for maintaining dimensional stability, both in use, and during long term storage.

PEEK has heretofore not been considered as a suitable material for use in magnetic recording tapes due to the focus on its use in capacitors and other applications. Nor has PEEK ever been one of the materials being employed for other applications by tape media substrate producers. Furthermore, the conventional wisdom of attempts to improve the dimensional stability for tape media to address the change in tape width and hence data track placement stability has been to pursue increased stiffness or modulus in the transverse direction (TD) for the substrate. In the process, however, adjustments must be made in the composition of the conventional substrates to achieve the increase modulus for the TD of the substrate. Accordingly, the inventive discoveries disclosed herein with regards to use of PEEK as a substrate material proceed contrary to conventional wisdom.

Figure 7:
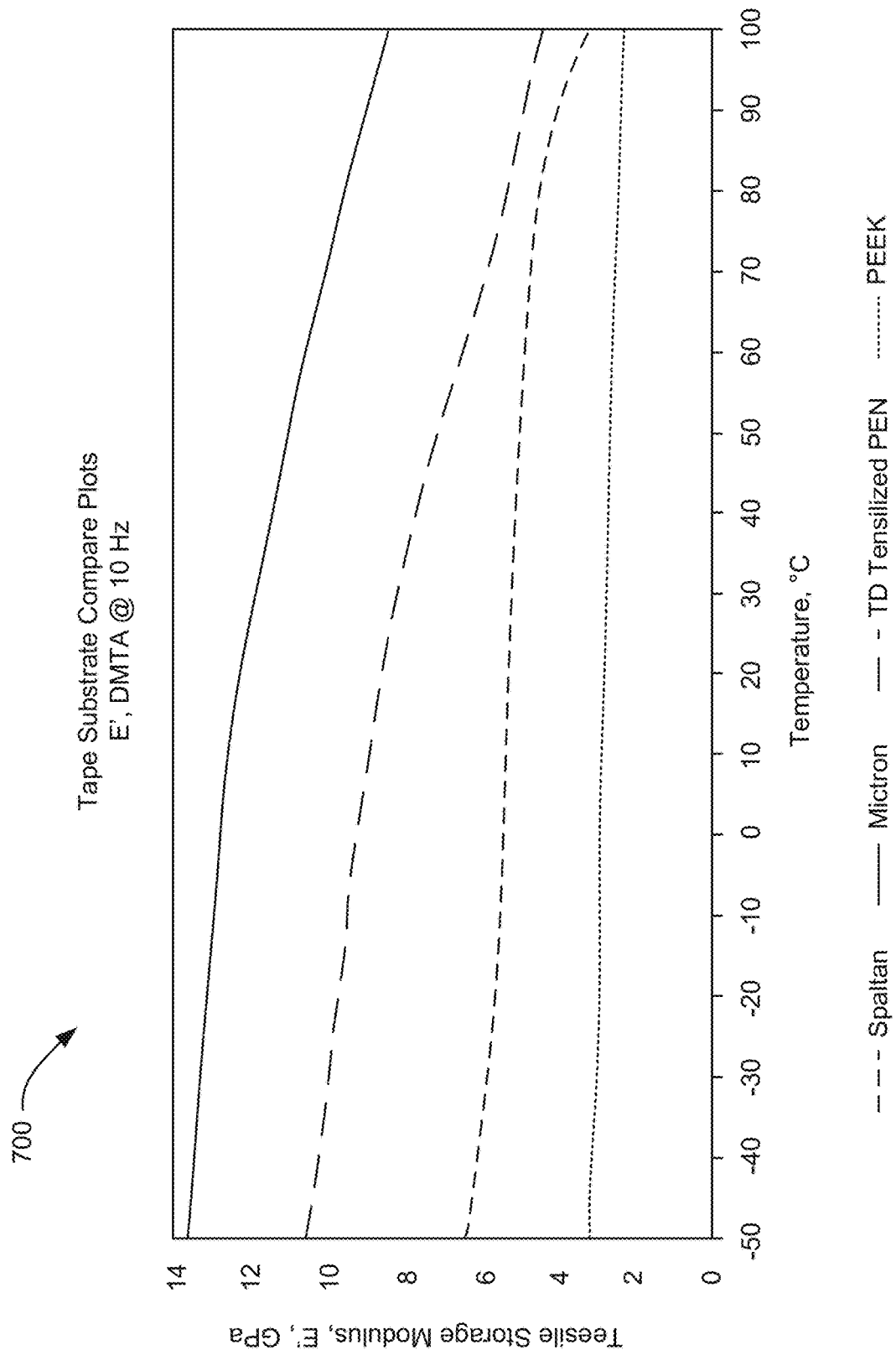
FIG. 7 is a chart comparing the Dynamic Mechanical Thermal Analysis (DMTA) results for the Tensile Storage Modulus (E') in gigaPascals (GPa) across a temperature range for examples of current tape substrates to an 8-micron-thick PEEK film.

FIG. 7 is a chart 700 comparing the DMTA results for the Tensile Storage Modulus (E') in GPa across a temperature range for examples of current tape substrates to an 8-micron-thick PEEK film from Shin Etsu, Ltd. (DMTA@ 10 Hz). The current tape substrates used in the experiment were: TORAY Spaltan™—a blend of chopped modified aramid (Mictron) in polyethylene terephthalate (PET); TORAY Mictron™—a modified aramid; and TEIJEN Ltd.—TD Tensilized PEN.

Figure 8:
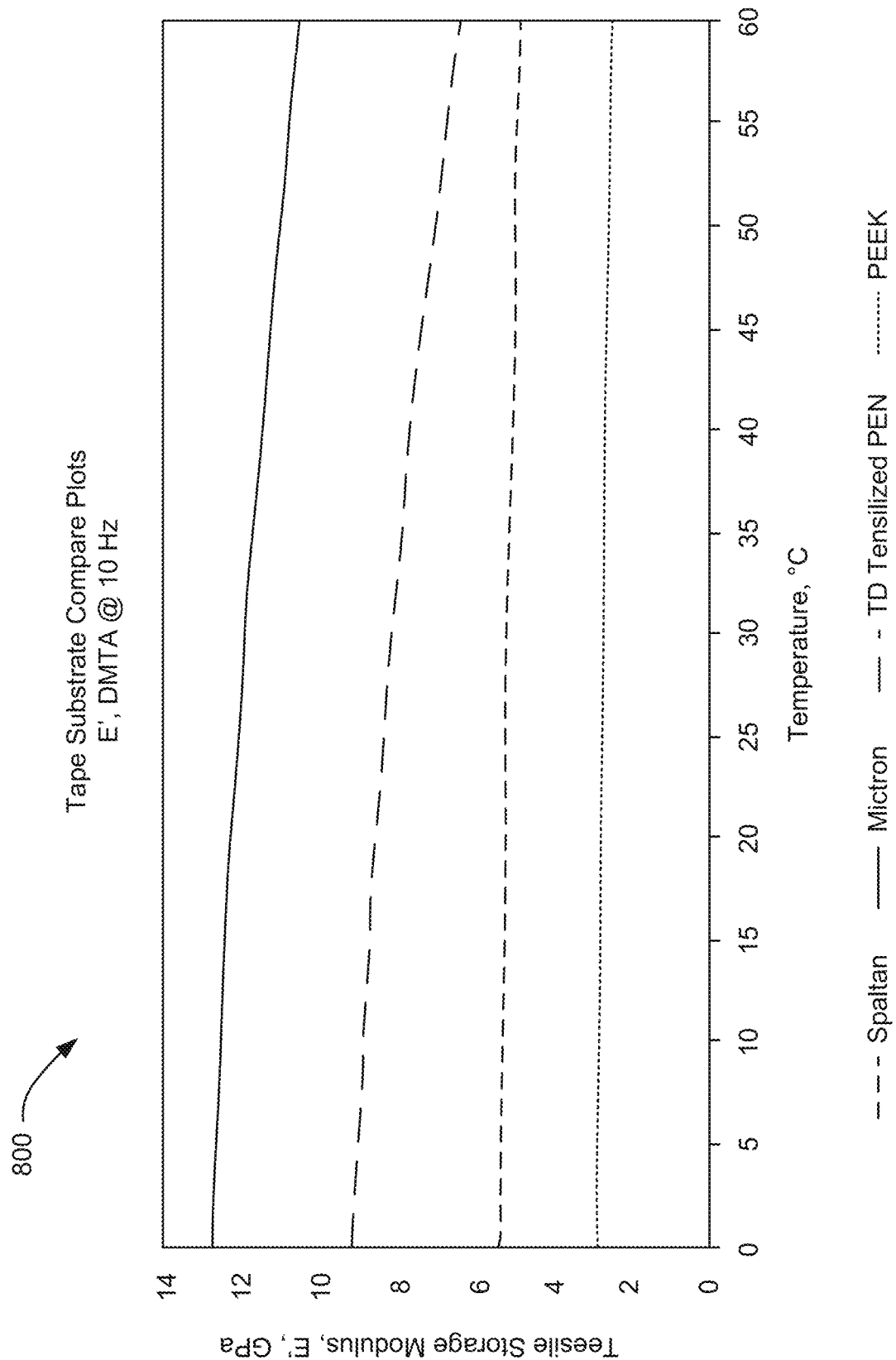
FIG. 8 is a chart depicting the data of FIG. 7 across a temperature range of 0° C. to −60° C.

The comparison is further expanded in the chart 800 of FIG. 8 over the range of temperatures at which tape is typically used and stored (0° C.-60° C.). Only two of the substrates demonstrate stable mechanical response over this temperature, the Toray Spaltan™ and the PEEK film sample. The Toray Spaltan™ has been found to exhibit good transverse dimensional stability (TDS), which is an increasingly important attribute of a tape to enable higher track density. However, it suffers from sensitivity to humidity and poor creep recovery. PEEK substrates according to various approaches disclosed herein address and resolve these issues.

Preferably, the tensile storage modulus E' of a PEEK substrate in accordance with various aspects is in a range of about 4 GPa to about 20 GPa, more preferably in a range of about 5 GPa to about 15 GPa, and ideally in a range of about 5.5 GPa to about 12 GPa, with values toward the higher end of this range being preferred. The tensile storage modulus E' can be controlled to some extent by controlling the molecular weight of the PEEK and potentially improved by increased crystalline chain orientation for the higher molecular weight PEEK materials not currently available but which would become available in view of the teachings presented herein, and potentially once a need for them is established for future tape media.

PEEK materials having an aromatic poly aryl ether ketone chemical structure and a chain length, n, of at least n=20 are preferred for substrate material in various approaches. Preferably the chain length is n=40 or higher, for example, n=50 to 100, etc. The chain length should not be so long as to render the PEEK unprocessable or brittle.

Various aromatic poly aryl ether ketones are usable in the various approaches falling within the scope of the present invention. Several exemplary PEEK materials are described below. This has been done by way of example only, and without limitation, to demonstrate a few of the various types of PEEK that may be employed in the many aspects of the present invention.

Referring again to FIG. 6, the substrate 604 may be the thickest layer in the magnetic recording tape. The use of PEEK enables a thinner substrate than conventional substrates currently in use, thereby enabling more tape to be wound into a conventional tape cartridge. In some approaches, the substrate has a thickness, measured in a direction perpendicular to a plane of the tape, of down to about 2.5 microns, e.g., in a range of about 3 microns to about 8 microns, preferably in a range of about 3 microns to about 4.5 microns, but could be thicker or slightly thinner than the outer values of these ranges.

Exemplary PEEK Materials

Figure 9:
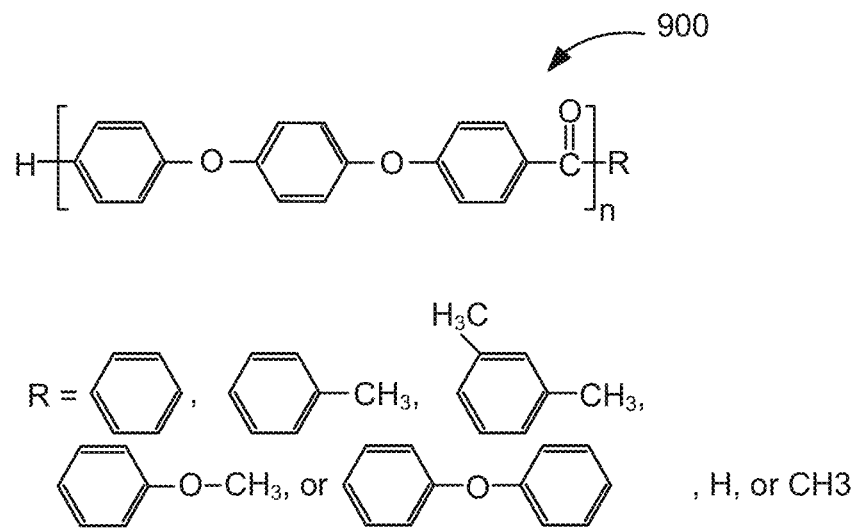
FIG. 9 illustrates an exemplary PEEK, in accordance with various approaches.

FIG. 9 illustrates an exemplary PEEK 900, in accordance with various approaches described herein. As an option, the present PEEK 900 may be implemented in conjunction with features from any other approach listed herein, such as those described with reference to the other FIGS. Of course, however, such PEEK 900 and others presented herein may be used in various applications and/or in permutations which may or may not be specifically described in the illustrative approaches listed herein. Further, the PEEK 900 presented herein may be used in any desired environment. The PEEK 900 in various permutations disclosed herein improves the stability and performance of tape storage media over the required environments for use and storage.

Figure 10:
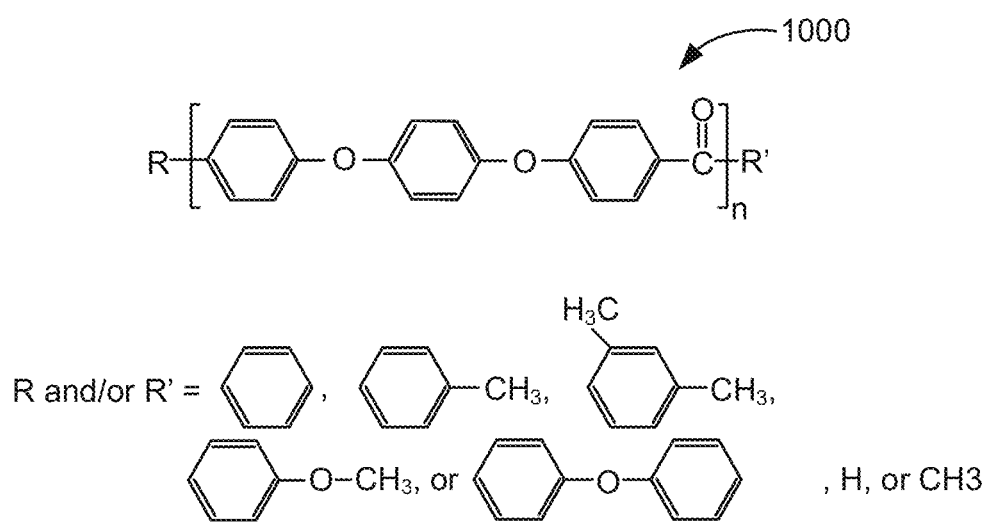
FIG. 10 illustrates an exemplary PEEK, in accordance with various approaches.

FIG. 10 illustrates another exemplary PEEK 1000, in accordance with various approaches described herein. As an option, the present PEEK 1000 may be implemented in conjunction with features from any other approach listed herein, such as those described with reference to the other FIGS. Of course, however, such PEEK 1000 and others presented herein may be used in various applications and/or in permutations which may or may not be specifically described in the illustrative approaches listed herein. Further, the PEEK 1000 presented herein may be used in any desired environment. The PEEK 1000 in various permutations disclosed herein improves the stability and performance of tape storage media over the required environments for use and storage.

Known fabrication techniques may be used to fabricate the PEEK raw material usable for formation of the substrate. In some approaches, step growth condensation polymerization reactions are used.

Figure 11:
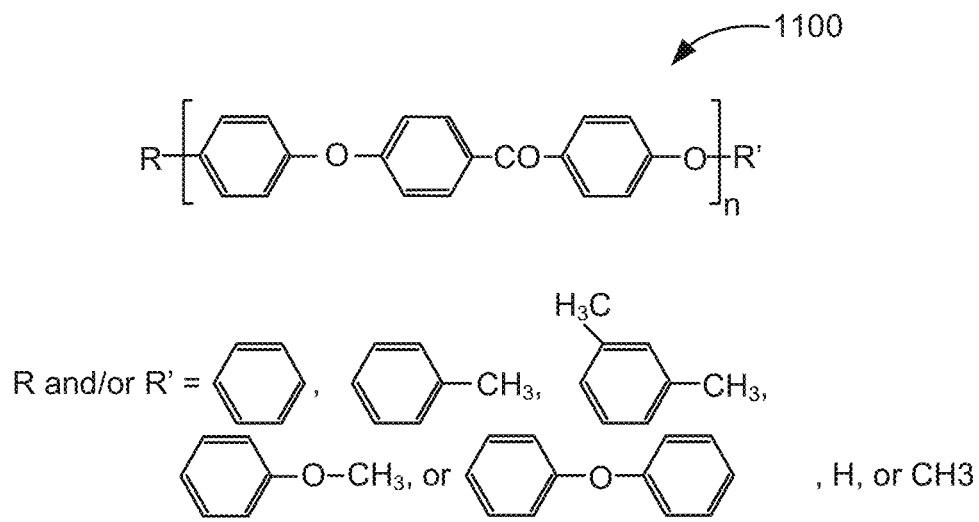
FIG. 11 illustrates an exemplary PEEK, in accordance with various approaches.

FIG. 11 illustrates another exemplary PEEK 1100, in accordance with various approaches described herein. As an option, the present PEEK 1100 may be implemented in conjunction with features from any other approach listed herein, such as those described with reference to the other FIGS. Of course, however, such PEEK 1100 and others presented herein may be used in various applications and/or in permutations which may or may not be specifically described in the illustrative approaches listed herein. Further, the PEEK 1100 presented herein may be used in any desired environment. The PEEK 1100 in various permutations disclosed herein improves the stability and performance of tape storage media over the required environments for use and storage.

Figure 12:
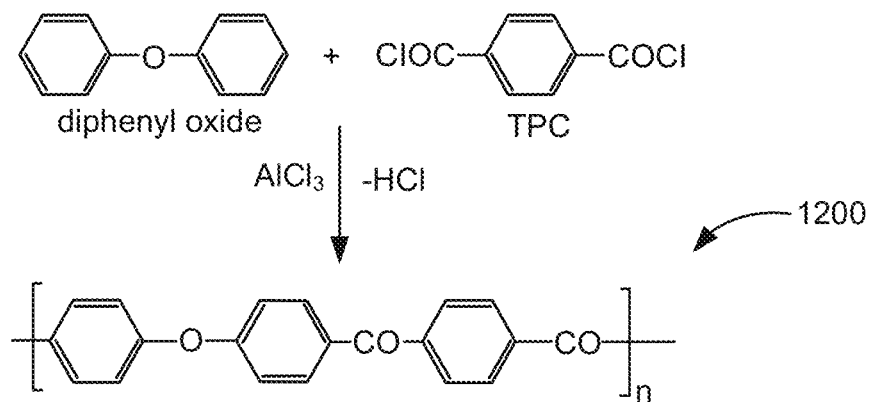
FIG. 12 illustrates an exemplary PEEK, in accordance with various approaches.

FIG. 12 illustrates another exemplary PEEK 1200 and an illustrative formation path thereof, in accordance with various approaches described herein. As an option, the present PEEK 1200 may be implemented in conjunction with features from any other approach listed herein, such as those described with reference to the other FIGS. Of course, however, such PEEK 1200 and others presented herein may be used in various applications and/or in permutations which may or may not be specifically described in the illustrative approaches listed herein. Further, the PEEK 1200 presented herein may be used in any desired environment. The PEEK 1200 in various permutations disclosed herein improves the stability and performance of tape storage media over the required environments for use and storage.

As noted above, a step growth condensation polymerization reaction may be used to produce the PEEK 1200. The illustrative step growth condensation polymerization reaction process shown in FIG. 12 includes reacting a diphenyl ether such as diphenyl oxide with a terephthalic acid chloride (TPC) in the presence of a metal chloride such as $AlCl_3$ or $FeCl_3$ and liberates HCL as a side product. The reactions are typically run in the melt or aromatic hydrocarbon solvents at high temperature so the HCL leaves as a gas and drives the reaction to very efficient chain growth.

The end groups of the PEEK 1200 may be similar to those shown in FIG. 15, or others.

In some approaches, the PEEK raw material may be purchased from a manufacturer or supplier of such materials as an off-the-shelf material. In preferred approaches, a manufacturer may create a suitable PEEK material having the desired characteristics such as chain length, etc. at the request of a manufacturer of magnetic recording tapes following the guidance provided herein. Typically, PEEK is sold in the form of pellets, which may be processed as described below to form a substrate for a magnetic recording tape. In other approaches, the PEEK substrate sheet may be created and/or purchased for use in the tape fabrication process.

KETASPIRE® PEEK materials are available from Solvay (Solvay Specialty Polymers USA, LLC, 4500 McGinnis Ferry Road, Alpharetta. Ga. 30005-3914 USA).

PEEK material is also available from Victrex (Victrex USA, Inc., 300 Conshohocken State Road Suite 120, West Conshohocken, Pa., 19428 USA).

PEEK films currently in production are not quite suitable for use as tape substrates. However, using the teachings presented herein, one skilled in the art can create a suitable PEEK film having the proper thickness, molecular weight, extrudability, and molecular orientation for use as a tape substrate.

PEEK is particularly advantageous for tape applications because it has a very low hygroscopic coefficient of expansion and is insoluble in organic solvents. Accordingly, PEEK substrates are not as susceptible to water-induced dimensional changes. However, PEEK can be melted and formed into a film. PEEK does not degrade at the higher temperatures used during fabrication, such as melt extrusion or the like. In contrast, aramids used in conventional tape products are modified to be soluble since they degrade during melting and cannot be melt extruded into films. To make the aramids soluble in even very hot polar organic solvents requires the aramid chain to be modified so as to increase solubility. This results in increased water up take and decreases the overall dimensional stability in the normal use and storage temperatures for tape media.

To form the substrate, in accordance with one approach, PEEK raw material is melt extruded and oriented to align the crystalline regions such that crystalline regions of the resulting substrate are generally aligned with one another. The melt extrusion process includes heating the PEEK raw material to a temperature that enables the PEEK raw material to be extruded by a melt extrusion apparatus to form a film of the desired thickness. The melt extrusion apparatus and process may be of known design for PEEK materials used in other industries, and generally includes a die (e.g., nozzle, rollers, etc.) through which the PEEK is extruded, and a mechanism to pull the extruded PEEK. An exemplary substrate fabrication line may use melt extrusion and a process called tenting, which uses grippers on a rail and chain frame that grabs the ends of the extruded sheets and pulls them in a heated oven laterally and length wise to effect a very controlled MD and TD orientation or tensilization.

The temperature used during melt extrusion should be below the degradation temperature of the PEEK raw material, which is material-dependent and typically well above the melt temperature as determined by normal thermal analysis techniques such as Differential Scanning calorimetry (DSC) or Thermal Gravimetric Analysis (TGA), as would be appreciated by one skilled in the art upon being apprised of the present descriptions. Typically, PEEK polymers are very stable to well above their softening point or true melting points. Depending on the molecular structure and chain length of the PEEK polymer, the softening occurs well above 150° C. Degradation in air can occur for some of the polymers when heated above 300° C., which is believed to be well above the useful processing temperatures of practical use in forming films suitable for magnetic tape substrates. In general, the processing temperature used in the process for film production is optimized around the specific properties of the polymer feed into the initial extrusion die head so as to allow good flow and orientation of the initial sheets as they are picked up by the grippers which then pull the film across the web and down web at the same time to effect the desired orientation or tensilization in the final cooled film.

Conventional conditions to align the crystalline regions of conventional substrate films may be employed with PEEK, in a manner that would be understood by one skilled in the art once being apprised of the present disclosure. For example, during melt extrusion, as melted PEEK is drawn out, the molecular chains tend to align in the direction of flow and move toward minimum free volume. The orientation of the films to align the crystalline regions allows the film to be created with higher modulus without sensitivity to water and near-fully elastic creep recovery, which is expected to provide the control of TDS needed by current tension compensation schemes.

The resulting sheet of PEEK may be stored for additional processing later, or additional layers may be added to the PEEK sheet. In one aspect, the PEEK sheet is wound onto a spool. In another aspect, one or more additional layers are added to the PEEK sheet.

The PEEK sheet, with or without additional layers, may be cut to the width needed for subsequent processing and/or to the specifications of the final product. For example, a wide PEEK sheet may be cut into strips having a width suitable for use with conventional coating apparatuses for adding additional layers thereto.

Underlayer

Any underlayer 606 known in the art may be used with the PEEK substrate 604, in accordance with various approaches. The underlayer 606 may be of a known material, and is preferably of a material that is capable of being grafted to the substrate 604 via radiation-induced grafting.

Recording Layer

Any recording layer 608 known in the art may be used with the PEEK substrate 604, in accordance with various approaches.

Illustrative Tape Fabrication Techniques

As discussed in more detail below, one or more additional layers such as an underlayer and/or backcoat are coupled to the PEEK substrate to fabricate a magnetic recording tape.

Current magnetic recording tape fabrication techniques rely on solvent interactions to make layers adhere to one another or require surface treatment such as plasma cleaning prior to coating. A significant downside of this surface modification is that the substrates are then susceptible to water-induced dimensional changes.

One or more additional layers may be added to improve adhesion of coatings and/or provide a controlled roughness for improved handling, as currently employed in tape substrates, may be added to the PEEK film as well. Modification of a PEEK film to improve the adhesion of coatings likely used to produce future magnetic recording tape products may require modification of the PEEK film surface through co-extrusion of another film material on one surface or the use of a plasma treatment to oxidize one surface as is currently practiced with existing tape substrates. In the case of radiation cured coatings, especially for the very thin coatings expected in future tape designs, sufficient activation of sites on the PEEK film may be achieved with UV light to resolve the adhesion issue so as to eliminate the need for additional surface treatments. Modification of the monomers used to construct the PEEK specifically optimized for use as a substrate for magnetic media may introduce functional groups in the PEEK film which can become activated upon exposure to UV light and react with functional groups in the coatings so as to fully resolve any adhesion issues and further improve the performance of the film for the application in magnetic tape media.

In preferred approaches, one or more additional layers such as an underlayer and/or backcoat are coupled to the PEEK substrate via radiation-induced grafting, e.g., via light-induced curing (e.g., crosslinking) of the layer(s) to the substrate. For example, the underlayer may be extruded adjacent the PEEK substrate, laminated thereon, and grafted thereto in real time via exposure to ultraviolet (UV) light and/or other radiation. The aromatics in the PEEK tend to be photoactive, and therefore lend themselves to the desirable radiation-induced curing. Moreover, the PEEK raw material and/or adjacent layer may be manufactured to have the desired chemical structure that allows radiation-induced grafting, as would be understood by one skilled in the art upon reading the present description. In some approaches, no adhesive is present between the underlayer and the substrate.

It bears mention that the extent of curing does not need to be high. Rather, a few chemical bonds per each hundred monomeric unit are sufficient for good adhesion, as chemical bonds are much stronger than the weaker bonding techniques used in conventional tape media. The chemical bonding of preferred aspects is also advantageous in terms of robustness and resistance to stresses, in that chemical bonds must be severed in order to detach the layers.

Generally, UV light will not go through plastics more than 1 micron thick. However, the underlayers used in preferred approaches are less than 1 micron thick, and therefore enable UV curing to occur.

Relative to current magnetic recording tape media, various benefits of a magnetic recording tape having the new PEEK substrate include, but are not limited to, one or more of: higher dimensional stability, greater tear resistance, greater resistance to the effects of aging (creep), etc.

It will be clear that the various features of the foregoing systems and/or methodologies may be combined in any way, creating a plurality of combinations from the descriptions presented above.

It will be further appreciated that approaches of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A magnetic recording tape, comprising:
   a substrate comprising a poly ether ether ketone (PEEK);
   an underlayer above the substrate; and
   a recording layer above the underlayer,
   wherein a chain length of the PEEK is greater than about 20.

2. The magnetic recording tape as recited in claim 1, wherein a chain length of the PEEK is about 50 to about 100.

3. The magnetic recording tape as recited in claim 1, wherein a tensile storage modulus of the substrate as measured by dynamic thermal mechanical analysis is in a range of about 4 GPa to about 20 GPa.

4. The magnetic recording tape as recited in claim 1, wherein a tensile storage modulus of the substrate as measured by dynamic thermal mechanical analysis is in a range of about 5.5 GPa to about 12 GPa.

5. A magnetic recording tape, comprising:
   a substrate comprising a poly ether ether ketone (PEEK);
   an underlayer above the substrate; and
   a recording layer above the underlayer,
   wherein crystalline regions of the substrate are generally aligned with one another,
   wherein a chain length of the PEEK is greater than about 20.

6. The magnetic recording tape as recited in claim 1, wherein a thickness of the substrate is in a range of about 2.5 microns to about 8 microns.

7. The magnetic recording tape as recited in claim 1, wherein a thickness of the substrate is in a range of about 3 microns to about 4.5 microns.

8. The magnetic recording tape as recited in claim 1, wherein the underlayer is grafted to the substrate.

9. The magnetic recording tape as recited in claim 1, wherein no adhesive is present between the underlayer and the substrate.

10. A tape cartridge, comprising:
    a housing; and
    a magnetic recording tape at least partially stored in the housing,
    the magnetic recording tape comprising:
      a substrate comprising a poly ether ether ketone (PEEK),
      an underlayer above the substrate, and
      a recording layer above the underlayer,
      wherein a chain length of the PEEK is greater than about 20.

11. The tape cartridge as recited in claim 10, wherein a chain length of the PEEK is about 50 to about 100.

12. The tape cartridge as recited in claim 10, wherein a tensile storage modulus of the substrate as measured by dynamic thermal mechanical analysis is in a range of about 4 GPa to about 20 GPa.

13. The tape cartridge as recited in claim 10, wherein a tensile storage modulus of the substrate as measured by dynamic thermal mechanical analysis is in a range of about 5.5 GPa to about 12 GPa.

14. The tape cartridge as recited in claim 10, wherein crystalline regions of the substrate are generally aligned with one another.

15. The tape cartridge as recited in claim 10, wherein a thickness of the substrate is in a range of about 2.5 microns to about 8 microns.

16. The tape cartridge as recited in claim 10, wherein a thickness of the substrate is in a range of about 3 microns to about 4.5 microns.

17. The tape cartridge as recited in claim 10, wherein the underlayer is grafted to the substrate via a mechanism created by radiation-induced grafting.

18. The tape cartridge as recited in claim 10, wherein no adhesive is present between the underlayer and the substrate.

19. The tape cartridge as recited in claim 10, comprising a nonvolatile memory coupled to the housing.

\* \* \* \* \*